Nov. 13, 1934.  H. SCHICHT  1,980,554
METHOD OF AND DEVICE FOR PRODUCING CONJUGATE WORM GEARINGS
Filed Dec. 30, 1932  3 Sheets-Sheet 1
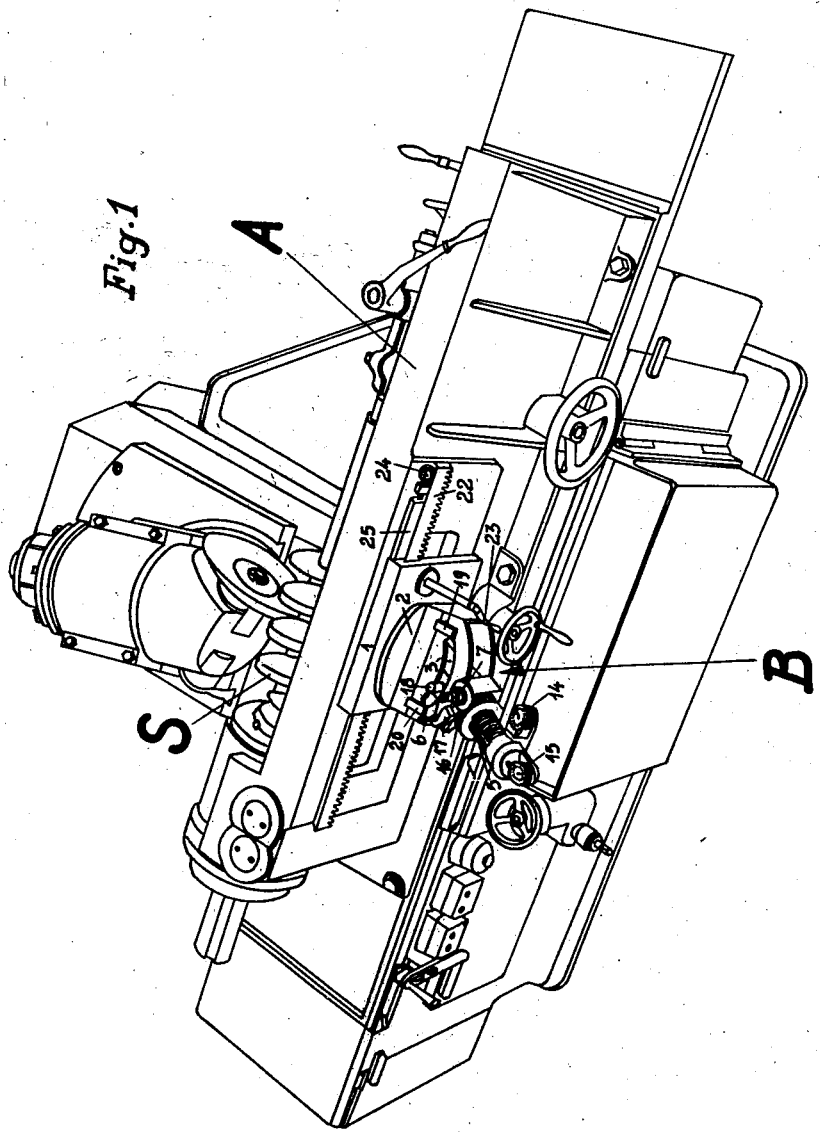
Inventor
H. Schicht

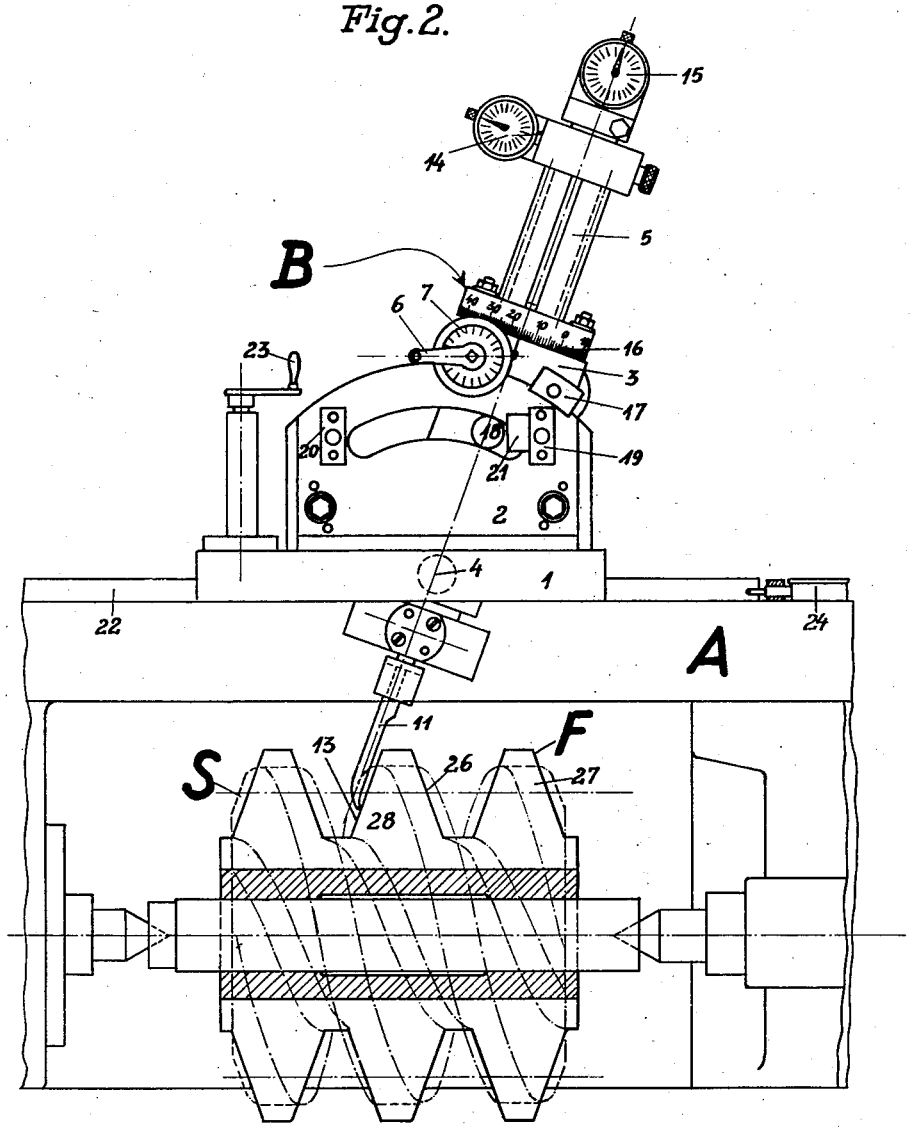

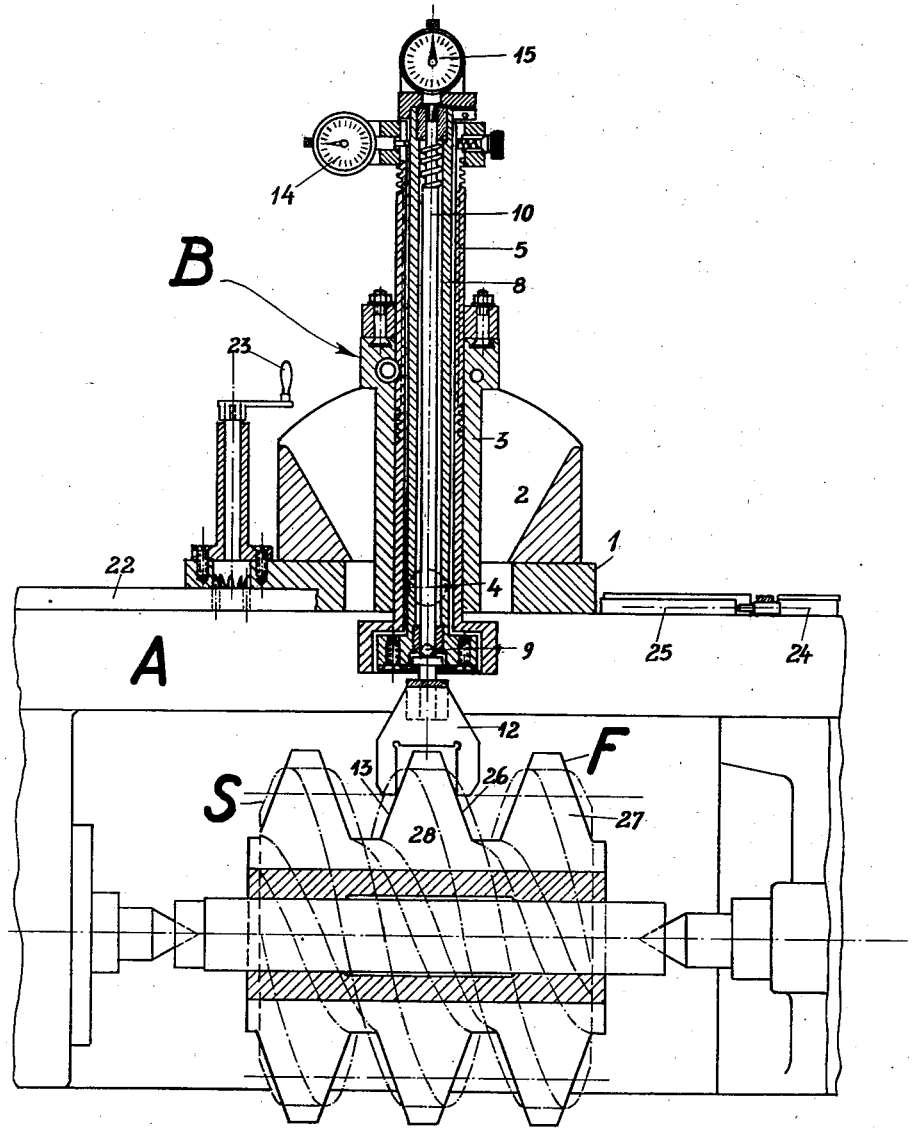

Patented Nov. 13, 1934

1,980,554

UNITED STATES PATENT OFFICE 1,980,554

METHOD OF AND DEVICE FOR PRODUCING CONJUGATE WORM GEARINGS

Heinrich Schicht, Huckeswagen, Germany, assignor to firm: W. Ferd. Klingelnberg Sohne, Remscheid-Berghausen, Germany Application December 30, 1932, Serial No. 649,617
In Germany June 3, 1932

6 Claims. (Cl. 51—278)

Practical experiences with worm gears have shown that the low efficiency and rapid wear of many worm gearings are largely due to the method of making the worms which method is inadequate not only with regard to working accuracy, but also in that the worms fail to have the correct dimensions correlative to those of the hob employed for cutting the conjugate worm wheel.

These differences between the dimensions of worm and worm wheel are based on the assumption that, without exception, all the worms which have been turned or ground in conformity with the basic dimensions (pitch diameter, linear pitch, thickness of tooth, included angle between the sides of worm thread and helix angle) of the new, unworn worm hob, are interchangeable with the worm wheels which have been cut by the worm hob during its total life. As will be seen from the considerations which have led to the method embodying the inventive idea described hereinafter and also from its practical realization, the abovementioned assumption does not prove true. A worm having basic dimensions (such as pitch diameter, linear pitch and thickness of tooth) which conform exactly with those of a new unworn hob cutter cannot fit truly and run satisfactorily unless in mesh with worm wheels which have been hobbed with said new unworn hob cutter. Whenever, therefore, the hob cutter is re-sharpened, it adopts a smaller diameter and accordingly a larger helix angle as a consequence of tooth clearance; hence, it no longer has conformity with the worm which has been produced in conformity with the hob dimensions of the unworn hob. These differences between the dimensions of worm and worm wheel become larger and larger with the increasing frequency of resharpening the hob cutter. All worms and worm wheels made by various methods are of different nature: thus, for example, the difference of helix angle exceeds 45 minutes when cutting worm wheels with the new and when cutting with a nearly used up worm hob, module 8 (diam. pitch 3.175), depth of clearance 8 mm. (say 0.315"). The larger the difference of helix angle, the less accurate is the fit between the worm and worm wheel, and the edges of the flanks are subject to a pinching or squeezing action with the result that frictional losses are caused with premature wearing and spoiling of the correct flank profile.

According to this invention, the method of worm grinding tends to abandon the principle of positive, absolute interchangeability and, instead, to turn towards the principle of individual interchangeability in groups, the arrangement being such that the worm hob itself, in varying conditions of wear, is clamped between the centers of the worm grinder and used as reference or master model in grinding the worm on the same machine. It is important that the means employed for obtaining conformity between worm and worm hob and consisting of a measuring device form an attachment of the machine itself. This measuring device serves both for gauging the dimensions of the worm hob and, later on, for controlling the progress of worm grinding, with the measuring device occupying the same position as previously in relation to the hob.

This arrangement is a matter of importance, for the reason that, owing to the intensive sliding movement alone, the worm gearing has a lower efficiency than a toothed gearing with greater rolling action, such as bevel gears, so that with ground hobs, working accuracy as well as most perfect conformity between hob and worm will play an outstanding part.

By way of example, the relationship of the method and the device necessary for realizing it will be described in conjunction with the accompanying drawings, in which Fig. 1 is a perspective view of the worm grinder with the measuring device as seen from above.

Fig. 2 is a plan view showing the measuring device while gauging the tooth flanks of a hob and its coordinate worm, respectively.

Fig. 3 is a cross-sectional plan view showing the measuring device while gauging the thickness of tooth and lead or linear pitch of a hob and its coordinate worm, respectively.

With the reference method of grinding worms, a worm hob F which, in its variable condition of wear, serves as a reference model for the worm S to be ground on the worm grinding machine, is clamped between the centers of the latter in place of the worm to be ground. The steps then performed are as follows: First, the hob is tested for the flank angle and straightness or curvature of the right and left tooth flanks by means of a measuring device B attached to the work table A of the worm grinder, the readings taken being noted; then, after the measuring device B has been reset, the distance of a given thickness of hob tooth from the cutter axis as well as the lead or linear pitch of the cutter are gauged. Next, after all basic dimensions of the worm hob have been found, the hob F is replaced by the worm S to be ground which, before starting with grinding, is likewise tested for its basic dimensions. The various readings, for example, of angle of side of tooth, tooth thickness and lead or linear pitch, are taken with the measuring device B in the same position which it occupied in measuring the dimensions of the hob which serves as a reference model. The worm grinder is set up to conform with the measurements taken on the hob cutter.

Apart from testing the flanks, the same measuring device may be used for gauging the thickness of tooth while grinding is proceeding and without necessitating the work being removed from the machine. The procedure of taking the necessary measurements is very simple, and likewise, changing over the measuring device from one kind of measurement to the other one may be easily accomplished. This is important since the measurements may be taken readily and the worm hob may be employed as a reference model for the worm to be ground.

Another advantage of the reference method of grinding worms which forms the basic idea of the invention lies in the fact that all those worm gearings which have been cut with one hob in the same condition of wear will be interchangeable. The dimensions of all the worms will be in exact correspondence with the dimensions of the cutter subject to said condition of wear. The attachment used for carrying out the reference method of grinding worms according to the invention consists of a measuring device B which is adjustable on the work table A in the direction of the work axis. In the following description, one design of the measuring device B will be explained by way of example, although a variety of other designs will be possible without departing from the spirit of the invention.

The measuring device consists of a plate 1 on which is mounted a housing 2 which may be swivelled about a horizontal axis perpendicular to the work axis. The sleeve 3 is swiveled within the housing 2 about an axis 4 and receives a guide tube 5 which is provided with a male thread and is axially adjustable by means of the crank 6. Readings of the adjustments made are taken by means of the graduated scale 7 (Fig. 2). The hollow lever 8 housed in the interior of the tube 5 is made to swivel slightly about the vertical trunnion 9 (Fig. 3).

The bore of the hollow lever 8 serves as a guide for the spindle 10 which is axially movable within it. Either a feeler pin 11 (Fig. 2) or a tooth thickness gauge or template 12 (Fig. 3) may be applied to one end of the spindle. With the feeler pin 11 in position the point of the pin contacts with the flanks 13 to be tested while the opposite end of the lever 8 is forced against the dial indicator 14. With the tooth thickness gauge 12 in position, the spindle 10 is forced against the dial indicator 15.

By means of the graduations 16 (Fig. 2), the feeler pin 11 and tooth thickness gauge 12 may be adjusted for the helix angle of the work. With the sleeve 3 swivelling about the axis 4, the feeler pin 11 is set to the angle of the side of the hob tooth or half the angle of the worm thread profile, the sleeve being locked to the housing 2 in the desired position by a screw and clamp 17. Accurate adjustment is facilitated by the provision of the pin 18 (Fig. 2) and gauges 19 and 20, respectively, a precision gauge block 21 placed between the pin and either of the gauges being used to suit the amount of the angle of flank face.

By means of the crank 23 the whole measuring device may be moved in a direction exactly parallel with the cutter axis along a guide way 22 of the work table A. (Fig. 1.)

A third dial gauge 24 or similar test indicator is secured to the work table A. Precision gauge blocks 25 may be placed between the contact pin of this indicator 24 and the plate 1 permitting accurate axial adjustments of the measuring device B within a small fraction of a millimeter.

The operation of the measuring device B is as follows:

In testing the flanks 13 or 26 of a cutter tooth or worm thread profile for the angle of flank face, the feeler pin 11 is mounted in position, and the sleeve 3 is swung to the left or right side until the pin 18 contacts with the precision gauge block 21 inserted between the pin and either of the gauges 19 and 20. In this position, the sleeve is clamped to the housing, and the feeler pin 11 is then moved along the flank face by turning the crank 6. Supposing, for example, the flank face to be exactly straight in the axial section, and provided that it is located under the correct flank angle, the pointer of the dial gauge 14 should not show any deviation from a given graduation to which it was set. If, however, in measuring the hob cutter F which serves as a reference model, the pointer of the dial gauge 14 shows any deviation, the sleeve 3 together with the feeler pin 11 may be adjusted by interposing other precision gauge blocks 21 until there is no deviation of the gauge pointer. With a curved flank of the hob cutter or worm, varying deviations will be observed with the indicator while the feeler pin 11 is moving across the curved tooth flank 13. According to the inventive idea of the reference grinding method, the final size of the precision gauge blocks 21 as well as the deviations of the dial indicator 14 corresponding with the curvature, if any, of the cutter flank, are noted and taken into account later on, when testing the flank of the worm profile to be ground so that an accurate conformity between the flanks of the cutter tooth and worm profile will be obtained by grinding.

To reset the feeler pin 11 from one cutter flank 13 to the other flank 26, either the cutter or the feeler pin may be turned over; in addition, the sleeve 3 is swung over to the other side so that the pin 18 which, previously, for example, was in contact with the precision gauge block 21 abutting against the gauge 19 will be forced against the same block which is however, now placed against the gauge 20.

When measuring the distance of a given tooth thickness of the cutter tooth profile from the cutter axis, a tooth thickness gauge or template 12 is substituted for the feeler pin 11 the two measuring edges of the template having a fixed distance from each other. One single template may be used for several cutters having different modules; for example, from module 6 to module 8 incl. (D. P. 4.233 to 3.175). By interposing a corresponding precision gauge block 21, the sleeve 3 is so adjusted that the axis of the guide tube 5 will be perpendicular to the cutter axis. By turning the crank 6, the template 12 is next forced against the tooth flanks of the cutter until the pointer of the dial indicator 15 points to a predetermined graduation. This reading is noted, and the same applies to the reading taken on the scale 7 indicating the distance the tooth thickness gauge has been advanced towards the cutter. Later on, the worm S to be ground is clamped in position in place of the cutter F which serves as a reference or master model, and the tooth thickness gauge 12 is again advanced towards the flank.

The tooth thickness of the worm profile and cutter tooth, as measured at the same distance from the axis of the worm will not be equal unless the readings taken on the graduated scale 7 and the dial indicator 15 are the same as previously. So long as these readings are not the same as previously, stock must be still ground off from the worm thread flanks.

In testing the lead or linear pitch of the hob cutter F, the tooth thickness gauge 12 is brought into contact with a tooth located at either end of the cutter, for example, with the tooth 27, and the distance of the measuring device B from the dial indicator 24 is gauged by the use of interposed precision blocks 25. Next, the entire measuring device B is moved along a distance corresponding to the lead or linear pitch or several pitches and contact is made between the tooth thickness gauge and another cutter tooth, for example 28, the gauge being so adjusted that the dial indicators 14 and 15, respectively, give the same readings as previously. Next, the distance of the measuring device B from the dial indicator 24 is gauged again by means of precision gauge blocks 25 to see if the actual lead or linear pitch of the hob cutter F corresponds to that specified for the respective module. This measurement allows of setting up the machine to correspond to the lead of the hob cutter when grinding the worm S which is required to conform with the cutter: hence, the worm will be ground according to the reference grinding method with just the same lead or linear pitch as that of the hob cutter.

According to the invention, the reference grinding method may be applied even independently of a worm grinding machine, if the measuring device cannot be secured directly to the available machine (Fig. 1). Use is made in this case of the same measuring device B described heretofore but it is mounted on a base plate forming a self-contained fixture on which the hob cutter F and worm S may be clamped and gauged in the same manner as on the worm grinding machine described above.

What I claim is:

1. The method of producing worm gearing in which the dimensions of the worm correspond accurately to those of the conjugate worm gear, which method consists in clamping the hob to be used in cutting the conjugate worm gear in the worm forming machine in place of a worm blank, measuring the dimensions of the hog regardless of its condition of wear, and setting up the machine in accordance with such dimensions, substituting a worm blank for the hob, and then forming the worm blank in accordance with the dimensions set up with the hob as a master model.

2. The method of producing worm gearing in which the dimensions of the worm correspond accurately to those of its conjugate worm gear, which method consists in setting up a worm forming machine with the hob to be used in cutting the conjugate worm gears as a master model, measuring the dimensions of the hob, and then forming a worm according to the dimensions of said hob.

3. The method of producing worm gearing in which the dimensions of the worm correspond accurately to those of the conjugate worm gear, which method consists in setting up a worm forming machine with the hob to be used in cutting the conjugate worm gear as a master model, regardless of its condition of wear, measuring the dimensions of the hob by testing the pressure angle and straightness of the sides of the said hob teeth and the lead of the hob, and then forming a worm in conformance with the dimensions obtained by such measurement.

4. The method of producing worm gearing in which the dimensions of the worm correspond accurately to those of its conjugate worm gear, which method consists in setting up a worm forming machine with the hob to be used in cutting the conjugate worm gears as a master model, regardless of its condition of wear, measuring the dimensions of the hob and the thickness of the teeth of the hob, and then forming a worm in accordance with the dimensions of said hob obtained by such measurement.

5. The method of producing accurately meshing worm gearing, which method consists in setting up a worm forming machine with a hob having its original dimensions altered by wear and resharpening as master model, forming a worm in accordance with the dimensions of said hob, and then using said hob for forming a conjugate worm wheel to mesh with said worm.

6. The method of producing accurately meshing worm gearing, which method consists in employing a hob of original dimensions to cut a worm wheel to mesh with a worm of original dimensions and conjugate to said worm wheel, resharpening the hob as it becomes worn, then setting up the forming machine with the resharpened hob as a master model, forming a worm in accordance with the dimensions of the resharpened hob, and using the resharpened hob to cut a worm wheel conjugate to said worm.

HEINRICH SCHICHT.